United States Patent [19]

Taylor

[11] Patent Number: 5,080,128
[45] Date of Patent: Jan. 14, 1992

[54] ANGLE BODY RESTRICTOR VALVE

[76] Inventor: Julian S. Taylor, 8300 SW 8th, Oklahoma City, Okla. 73128

[21] Appl. No.: 656,893

[22] Filed: Feb. 19, 1991

Related U.S. Application Data

[63] Continuation-in-part of Ser. No. 517,102, May 1, 1990, Pat. No. 5,020,568.

[51] Int. Cl.$^5$ ............................................. F16K 5/04
[52] U.S. Cl. ................................. 137/316; 137/625.31
[58] Field of Search .............. 137/315, 316, 625.31, 137/454.2, 454.5, 454.6

[56] References Cited

U.S. PATENT DOCUMENTS

| | | | |
|---|---|---|---|
| 2,536,946 | 1/1951 | Larson | 137/625.31 X |
| 2,935,293 | 5/1960 | Monson | 137/625.31 X |
| 3,207,181 | 9/1965 | Willis | 137/625.31 |
| 4,098,294 | 7/1978 | Woods | 137/625.31 X |
| 4,395,019 | 7/1983 | Searles | 137/625.31 X |
| 4,922,950 | 5/1990 | Taylor | 137/316 |
| 4,967,787 | 11/1990 | Taylor | 137/316 |

Primary Examiner—Stephen M. Hepperle
Attorney, Agent, or Firm—Robert K. Rhea

[57] ABSTRACT

A fluid flow restrictor choke valve is formed by a right angular valve body having inlet and outlet ports defining a flow passageway with an annular shoulder intermediate its ends. A pair of discs having orifices therethrough are superposed on the shoulder with one of the discs being angularly rotatable relative to the other. A yoke inserted into the valve body, opposite its outlet port, is anchored to the rotatable disc and impinges it against the fixed downstream disc by a stem bushing surrounding a stem connected with the yoke. The yoke being angularly rotated by a handle secured to its stem end portion projecting outwardly of the valve body opposite the outlet port.

5 Claims, 1 Drawing Sheet

ANGLE BODY RESTRICTOR VALVE

CROSS REFERENCE TO RELATED APPLICATION

This application is a continuation-in-part of the application filed by me in the U.S. Pat. and Trademark Office on May 1, 1990, under Ser. No. 07/517,102, now U.S. Pat. No. 5,020,568 for Unitized Disc Flow Control Assembly For A Restrictor Valve.

BACKGROUND OF THE INVENTION

1. FIELD OF THE INVENTION

This invention relates to fluid flow control valves and more particularly to a multiple disc orifice choke valve.

2. DESCRIPTION OF THE PRIOR ART

Flow restrictor valves utilizing a pair of discs having mating and mismating orifices for controlling the flow rate through the valve are known.

Since flow control disc valves require that the discs be superposed or juxtaposed in the flow passageway with at least one of the discs being angularly rotatable relative to the other, it is necessary that an annular shoulder transversely intersect the flow passageway.

Diametrically opposite apertures or sockets in the shoulder cooperatively receive pins in one disc for preventing angular rotation of the fixed disc relative to the valve body or other disc.

Machine forming such a shoulder in a valve body from valve stock has generally proved unsatisfactory for the reason, in order for the shoulder to adequately support the disc and disc anchoring pins, the bore defining the inner perimeter of the shoulder materially restricts the diameter which may be used through mating and mismating orifices in superposed discs, also materially limiting the otherwise flow capacity of such a valve's fluid passageway.

To compensate for this flow control restriction, it has been the practice to cast the valve body or at least a cage supporting disc in a flow passageway in order to provide a shoulder and a generally oblong aperture through the wall forming the shoulder and defining the inner limit thereof with sufficient space to receive the discs anchoring pins.

However, from an economic standpoint, the cost of casting the valve body or the cage holding the flow control discs adds considerably to the cost of such valves.

My above named application and U.S. Pat. Nos. 4,922,950 and 4,967,787, disclose right angle body valves having cast discs supporting cages interposed in the flow passageway.

This invention is distinctive over the prior art, the valve in the above named application and these patents by providing a machined valve body defining an annular shoulder in the flow passageway having a dual offset bore axial opening therethrough permitting use of discs having orifices approximating valve body flow passageway full capacity.

SUMMARY OF THE INVENTION

A substantially tee-shaped valve body has a through bore and a lateral bore forming an outlet port at one end of the body and a lateral inlet port. The valve body through bore is counterbored to define an upstream facing annular shoulder intermediate its ends having its inner limit defined by dual overlapping perimeter bores through the shoulder. A disc having at least a pair of orifices therethrough is secured to the upstream side of the shoulder.

A yoke inserted into the top or head end portion of the valve body is pinned to a companion disc with identical orifices for angular rotation of the latter by a yoke stem projecting beyond the head end of the valve body. A stem bushing threadedly secured to the valve head end surrounds the stem and biases the yoke and rotatable disc into contiguous contact with the fixed disc.

A disc control secured to the valve stem provides manual or automatic control of the position of the rotatable disc relatively to the fixed disc.

The principal object of this invention is to provide a right angular multiple orifice disc fluid choke valve in which one disc is angularly rotated relative to the other in a valve open or closed direction by angular rotation of a stem projecting outwardly of a valve body.

A further object is to provide an easy to manufacture valve body configuration and still provide the maximum flow possible with the constraint that the downstream disc must be supported and pinned to the body.

DESCRIPTION OF THE PREFERRED EMBODIMENTS

Figure 3:
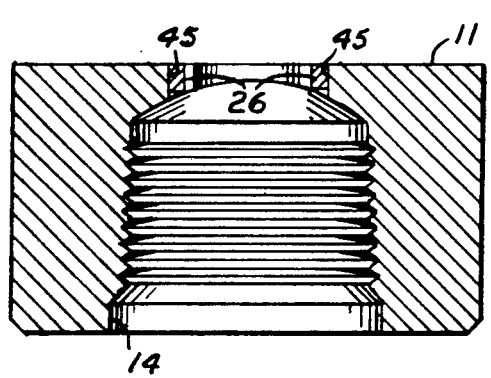
FIG. 3 is a vertical cross sectional view taken substantially along the line 3—3 of FIG. 2.

Like characters of reference designate like parts in those figures of the drawings in which they occur.

In the drawings:

The reference numeral 10 indicates a flow restrictor valve having a substantially tee-shaped valve body 11 bored and counterbored, as at 12 and 13, from its head end 15 and commonly referred to as a right angle valve. The body 11 is characterized by a threaded outlet port 14 opposite its head end 15 and a second threaded inlet port 16 disposed intermediate the length of the body with its axis normal to the axis of the bore 12 and outlet port 14 and forming a fluid passageway with fluid flow in the direction of the arrow 20.

Figure 1:
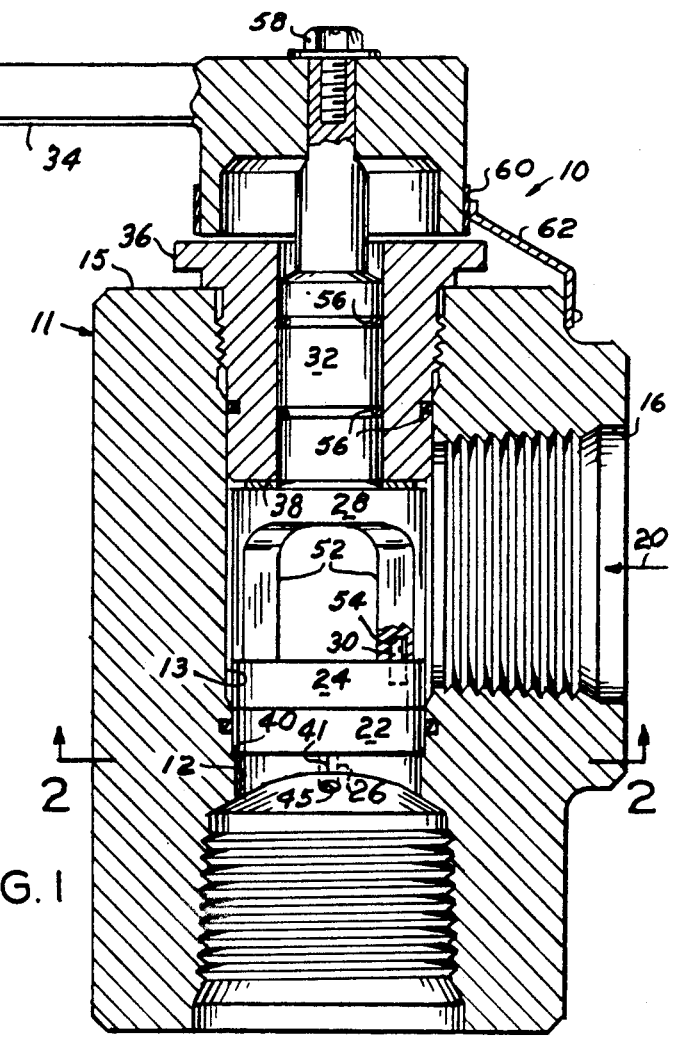
FIG. 1 is a vertical cross sectional view of the valve.

A pair of superposed discs 22 and 24, each having orifices therethrough as presently explained, are transversely interposed in the fluid passageway 20. The disc 24 is pinned to the valve body by pins 26, only one being shown, (FIG. 1), in its downstream surface.

A yoke 28 is inserted into the head end 15 of the valve body and bridges orifices in the disc 24 and is pinned thereto by pins 30, only one shown, (FIG. 1), for angular rotation of the disc 24 by a stem 32 projecting axially outward of the head end of the valve body and connected with a handle 34. A valve bushing 36 is threadedly secured to the head end of the body and journals the yoke stem 32 in guiding relation.

A thrust bearing 38 is interposed between the stem bushing 36 and the upper surface of the yoke 28 to ensure contiguous contact between the confronting surfaces of the discs 22 and 24 for the reasons believed obvious.

Figure 2:
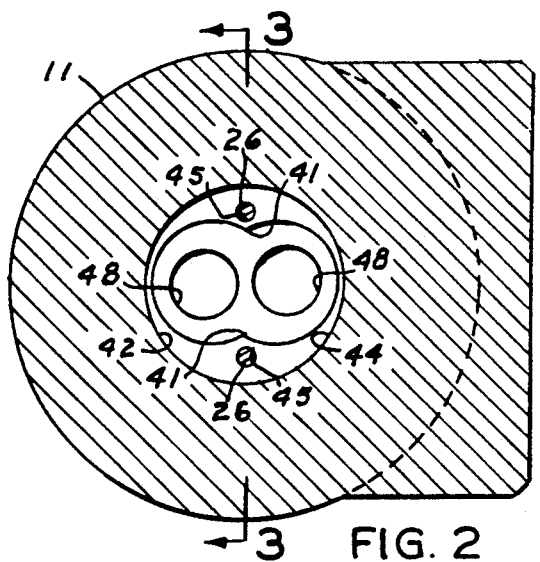
FIG. 2 is a horizontal cross sectional view taken substantially along the line 2—2 of FIG. 1.

Referring more particularly to FIGS. 2 and 3, the wall of the body forming the bore 12 is provided with an annular shoulder 40 upstream from the threads of the outlet port 14 and downstream from the lateral lower limit of the inlet port 16, as viewed in the drawings, for supporting the lower disc 22 and anchoring the disc against rotation.

The shoulder inner or axial wall surface is contoured by a pair of perimeter partially overlapping bores 42 and 44 drilled on parallel radially spaced axes in aligned relation with respect to the axis of the bore 12.

The shoulder 40 is further vertically bored on a selected small diameter bore 45 adjacent the respective opposing intersection 41 of the walls defining the bores 42 and 44, as best seen in FIG. 2, for receiving the disc anchor pins 26 as presently explained.

Figure 4:
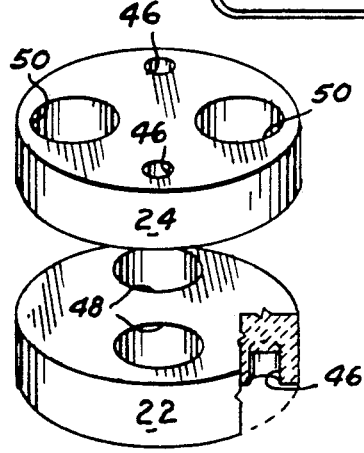
FIG. 4 is an exploded perspective view of the discs, per se.

Referring also to FIG. 4, the bottom surface of the disc 22 and the top surface of the disc 24 are each provided with a pair of diametrically opposed sockets 46 disposed adjacent their respective peripheries, only one being shown for the disc 22.

Figure 5:
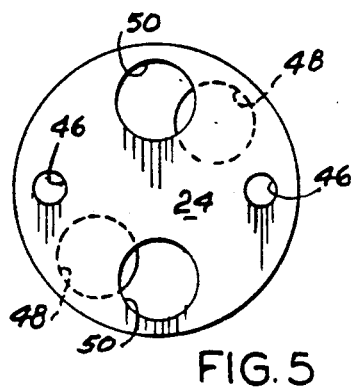
FIG. 5 is a top view of the superposed discs in partially mated position.

Similarly, both discs are provided with radially spaced diametrically opposed through bores 48 and 50, respectively, disposed in 90° relation with respect to the axes of the sockets 46 so that when the upper disc 24 is angularly rotated by the yoke 28 as presently explained, the disc apertures 48 and 50 are respectively mated, mismated or partially mismated, as illustrated by the top plan view of the discs (FIG. 5).

The yoke 28 is characterized by a pair of legs 52 disposed in diametric opposition on the top disc 24 in overlying relation with respect to the disc sockets 46. The yoke legs 52 are similarly provided with downwardly open sockets 54, only one being shown (FIG. 1), respectively receiving the pins 30 for anchoring the yoke to the disc 24. The pins 26, inserted into the bottom disc sockets 46 and shoulder bores 45 anchor the bottom disc 22 to the shoulder 40.

O-rings 56 seal the yoke stem 32 with the valve body and sleeve bushing, respectively.

The handle 34 is axially secured at its valve control end with the stem 32 by a screw 58. Indicia on a handle dial 60 indicates the position of the disc orifices by an indicator 62 mounted on the head end 15 of the valve body.

Operation

Assuming the valve and its components have been assembled as described hereinabove and the valve has been interposed in a high pressure fluid flow line, not shown, the disc 24 is normally in the position, illustrated for the disc by FIG. 4, in which flow through the passageway 20 is completely blocked.

Angular rotation of the handle 34 angularly rotates the top disc 24 and its orifices 50 toward a mated position with the lower discs orifices 48 which provides full flow of fluid through the valve when in mated position.

When the disc 24 is angularly positioned, relative to the disc 22, as for example, as illustrated by FIG. 5, the valve assumes its principal function, that is choking or restricting fluid flow through the passageway 20.

Obviously the invention is susceptible to changes or alterations without defeating its practicability. Therefore, I do not wish to be confined to the preferred embodiment shown in the drawings and described herein.

I claim:

1. A multiple orifice disc choke valve, comprising:

a valve body having a fluid flow passageway therethrough defined by an inlet port disposed at right angle with respect to an outlet port;

an annular shoulder on the body wall forming the outlet port downstream from the inlet port, the inner axial surface of said shoulder defining the perimeter of partially overlapping valve body bores on parallel radially spaced axes parallel with the outlet port axis;

a pair of superposed fluid control discs supported by said shoulder, each disc of said pair of discs having through orifices disposed on axes parallel with and radially offset with respect to the axis of the respective disc;

a yoke having laterally spaced depending legs bearing against said uppermost disc, said yoke having a stem axially projecting outwardly of said body opposite the outlet port;

a stem bushing surrounding said stem and secured to said body;

a thrust bearing interposed between said bushing and said yoke for maintaining contiguous contact between the confronting surfaces of said discs;

pin means for securing said uppermost disc to said yoke legs;

other pin means for anchoring said lowermost disc to said shoulder;

means for angularly rotating said stem; and, indicia means for visually indicating the angular position of the rotatable disc orifice relative to the stationary disc orifice.

2. A multiple orifice disc choke valve, comprising:

valve body having a fluid flow passageway therethrough defined by an inlet port disposed at right angle with respect to an outlet port;

an annular shoulder on the body wall forming the outlet port downstream from the inlet port, the inner axial surface of said shoulder defining the perimeter of partially overlapping valve body bores on parallel radially spaced axes parallel with the outlet port axis;

a pair of superposed fluid flow control discs supported by said shoulder, each disc of said pair of discs having at least one orifice disposed on an axis parallel with and radially offset with respect to the axis of the respective disc; and, means including a valve stem projecting outwardly of said body opposite the outlet port for angularly rotating one disc of said pair of discs relative to the other.

3. The multiple orifice disc choke valve according to claim 2 in which the disc rotating means further includes:

a yoke overlying the rotatable disc and secured to said stem; a stem bushing surrounding the stem and threadedly secured to the body; and, a thrust bearing interposed between said bushing and said yoke for maintaining the confronting surfaces of said discs in contiguous contact.

4. The multiple orifice disc choke valve according to claim 3 in which said yoke is characterized by radially spaced legs straddling at their depending ends the orifice in the uppermost disc and in which the disc rotating means further includes:

pins means interposed between said yoke legs and said rotatable disc for joining said rotatable to said yoke.

5. The multiple orifice disc choke valve according to claim 4 and further including:

anchor pins means interposed between the lowermost disc and said shoulder for precluding angular rotation of the lowermost disc relative to the body; and, control means secured to said stem for angularly rotating said uppermost disc relative to said lowermost disc for regulating the volume of fluid through the passageway.

* * * * *